S. ANDREWS.
Velocipede.
No. 95,629.
Patented Oct. 12, 1869.
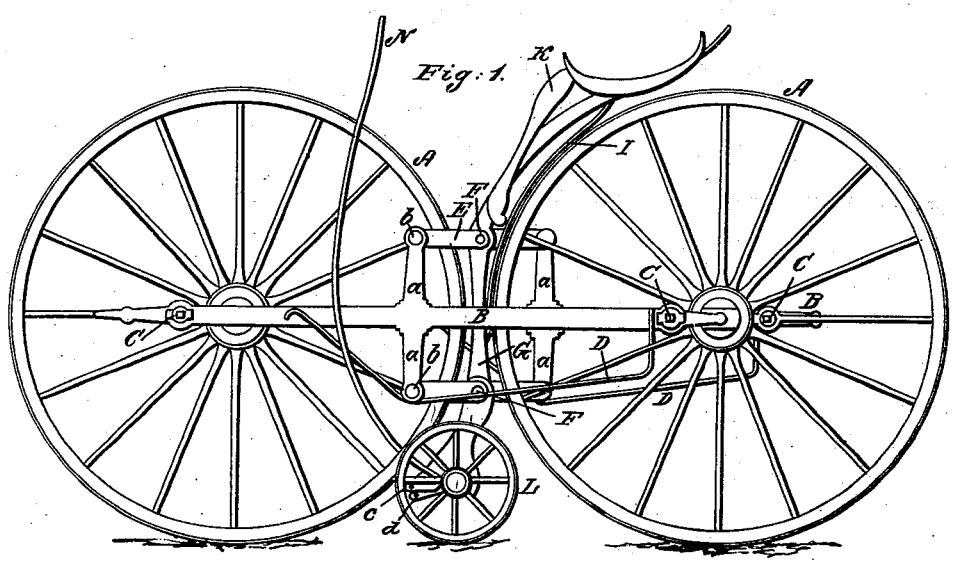
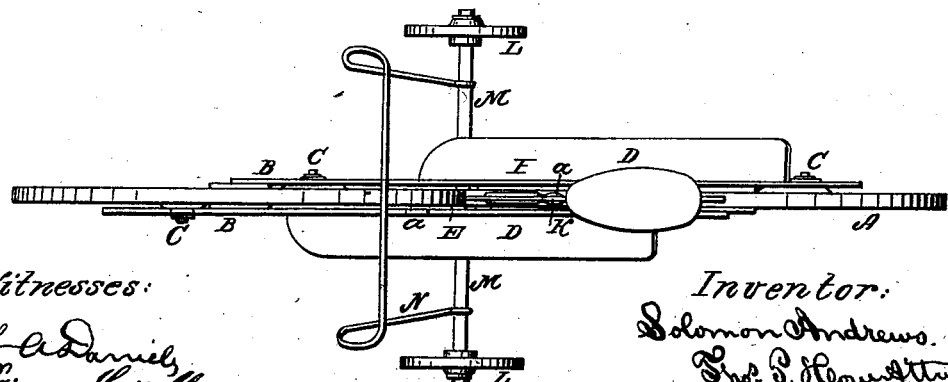
Witnesses:
Inventor:
Solomon Andrews

UNITED STATES PATENT OFFICE.

SOLOMON ANDREWS, OF PERTH AMBOY, NEW JERSEY.

IMPROVEMENT IN VELOCIPEDES.

Specification forming part of Letters Patent No. 95,629, dated October 12, 1869.

*To all whom it may concern:*

Be it known that I, SOLOMON ANDREWS, of Perth Amboy, in the county of Middlesex and State of New Jersey, have invented certain Improvements in Velocipedes, of which the following is a specification.

The first part of my said invention relates to the principal wheels of the said velocipede or curropede and their action and combination with other parts.

The second part of the said invention relates to the combination of devices by which the seat of the vehicle is supported.

The third part of the said invention relates to the combination, with the principal or driving wheels of the machine, of auxiliary wheels, as hereinafter more fully set forth.

In the accompanying drawings, Figure 1 is a side elevation of the velocipede or curropede embodying my said invention. Fig. 2 is a plan of the same.

A A are the driving-wheels, which are of equal size and without axles, and which are so connected to each other by the connecting-rods B B and the crank-pins C C as to be one forward of the other and in line with each other, as shown in the drawings. For the purpose of making this connection, and for other purposes, two crank-pins, C C, are set in opposite spokes of each wheel and on opposite sides of the wheel, as shown, and the connecting-rods B B are hung upon these crank-pins, as shown in the drawings. These connecting-rods B B also have pedals, D D, attached to them, as shown, on which pedals the pressure of the foot is applied to propel the machine.

*a a a a* are arms projecting upward and downward from the connecting-rods B B, and are connected by the wrist-pins *b b b b* to the cranks E E E E. These cranks E are connected in pairs by the axles F F, and these axles extend through the standard G, which supports the seat or saddle of the machine, and also performs services further hereinafter mentioned.

I is the brake of the machine, to check its motion, which brake is hung to one end of the brake-lever K, which latter is hung upon the standard G, as shown.

L L are the steering-wheels of the machine. They are hung upon the axle M, which latter is hung by an arm, *c*, to the swivel *d*, and by the latter to the foot of the standard G, as shown. The foot of this standard G is forked or made with a recess in its foot to receive the rear end of the arm *c*, when it is raised up to elevate the wheels L, and also has a catch made in it to receive the axle M, so that when the said axle is raised up the wheels L are made to stand parallel with the line of the driving-wheels.

N is a lever firmly attached at the lower ends to the axle M, for the purpose of raising or lowering the wheels L, said lever extending up from the axle M at one side of the machine and over the top of the machine and running downward at the other side of the machine to the said axle M. By moving the upper end of this lever into its forward position the axle M is raised up, so as to lift the wheels L from the floor or even surface on which the machine may be run, and the arm *c* being by this operation raised into the recess in the foot of the standard G, the wheels L are thereby prevented from vibrating. By bringing the upper end of the lever backward or toward the saddle as far as possible, the wheels L are so lowered as to bear upon an even surface and raise the forward driving-wheel from the floor or other surface, and when they are so lowered the arm *c* is disengaged from the recess in the foot of the standard G, so as to allow the axle M to vibrate freely in a horizontal direction, and thus furnish the means for steering the machine.

When the machine is to be run in a straight line, the upper end of the lever N is moved into its forward position and kept or allowed to remain there, when the wheels L simply serve the purpose of preventing the machine from upsetting should the rider allow it to tip in either direction. When, however, the machine is to be turned from a straight line, the upper end of the lever N is drawn backward toward the saddle, so as to raise the forward driving-wheel from the ground, and the axle M turned by means of the bar which forms the top of the lever N, so as to properly guide the machine.

I claim as my invention—

1. Two wheels, A A, of equal diameters, arranged in a right line, the one forward of the other, and connected together by a connecting-rod, B, on each side, attached to crank-pins C on the spokes of the wheels, to which connecting-rod the power is to be applied for driving the machine.

2. The combination, with the connecting-rods B B, of the cranks E and the standard G, substantially as hereinbefore set forth.

3. The combination of two driving-wheels of equal diameter, fore and aft of each other, with two wheels, one on each side, in a cruciform plan, which will make it a four-wheel machine, and which side wheels being depressed will make it run on three wheels, so as to turn it around, and when they are elevated making it run on two wheels, like a bicycle.

SOLOMON ANDREWS.

Witnesses:
WILLIAM DONNELY,
J. H. HOW.